United States Patent
De Jong et al.

(10) Patent No.: US 11,206,389 B2
(45) Date of Patent: Dec. 21, 2021

(54) METHOD FOR REDUCING MOIRE PATTERNS ON AN AUTOSTEREOSCOPIC DISPLAY

(71) Applicant: ZHANGJIAGANG KANGDE XIN OPTRONICS MATERIAL CO. LTD, Zhangjiagang (CN)

(72) Inventors: Pieter Wilhelmus Theodorus De Jong, 's-Hertogenbosch (NL); Jurjen Caarls, Eindhoven (NL); Jan Van Der Horst, Eindhoven (NL)

(73) Assignee: ZHANGJIAGANG KANGDE XIN OPTRONICS MATERIAL CO. LTD, Zhangjiagang (CN)

( * ) Notice: Subject to any disclaimer, the term of this patent is extended or adjusted under 35 U.S.C. 154(b) by 0 days.

(21) Appl. No.: 16/959,297

(22) PCT Filed: Dec. 24, 2018

(86) PCT No.: PCT/NL2018/050887
§ 371 (c)(1),
(2) Date: Jun. 30, 2020

(87) PCT Pub. No.: WO2019/132660
PCT Pub. Date: Jul. 4, 2019

(65) Prior Publication Data
US 2021/0067763 A1    Mar. 4, 2021

(30) Foreign Application Priority Data

Dec. 30, 2017   (NL) .................................... 2020217

(51) Int. Cl.
*H04N 13/305*   (2018.01)
*H04N 13/122*   (2018.01)
(Continued)

(52) U.S. Cl.
CPC ........... *H04N 13/305* (2018.05); *G02B 30/27* (2020.01); *H04N 13/122* (2018.05); *H04N 13/31* (2018.05); *H04N 13/366* (2018.05)

(58) Field of Classification Search
CPC .... H04N 13/305; H04N 13/122; H04N 13/31; H04N 13/366; H04N 13/327; H04N 13/324; G02B 30/27
(Continued)

(56) References Cited

U.S. PATENT DOCUMENTS 5,479,270 A * 12/1995 Taylor .................... G03B 35/24
355/22
5,613,013 A * 3/1997 Schuette .................. G06K 9/32
356/400

(Continued)

OTHER PUBLICATIONS

International Search Report for PCT/NL2018/050887, dated Jun. 7, 2019, 3 pages.
Written Opinion of the ISA for PCT/NL2018/050887, dated Jun. 7, 2019, 6 pages.

*Primary Examiner* — Michael Lee
(74) *Attorney, Agent, or Firm* — Gang Yu

(57) ABSTRACT

The invention relates to a method for reducing moire patterns on an autostereoscopic display, which display comprises an array of pixels, each having at least one sub-pixel corresponding to a main color, lined with a view altering layer, such as a lenticular lens stack or parallax barrier, and wherein the display further comprises an eye tracking system for determining the position of the eyes of a viewer relative to the display, which method comprises the steps of: —moire pattern detection by repeating for each main color the steps of: +activating the sub-pixels of all pixels corresponding to the single main color; obtaining moire pattern data by observing the display from a plurality of viewing positions; determining from the obtained moire pattern data the frequency, phase, direction and amplitude of the moire (Continued)

pattern for each of the viewing positions and storing the determined values; —controlling the pixels of the autostereoscopic display to display images, wherein the controlling comprises at least the steps of: determining the viewing position of the eyes of a viewer using the eye tracking system; rendering 3D images from image data, while correcting the 3D images by superimposing a compensation pattern for each main color, which pattern is generated based on the stored values and the determined viewing position to reduce the moire pattern for said viewing position.

6 Claims, 3 Drawing Sheets

(51) Int. Cl.
  *H04N 13/31* (2018.01)
  *H04N 13/366* (2018.01)
  *G02B 30/27* (2020.01)
(58) Field of Classification Search
  USPC .......................................... 345/419; 348/607
  See application file for complete search history.

(56) References Cited

U.S. PATENT DOCUMENTS

| | | | | |
|---|---|---|---|---|
| 6,101,008 | A | * | 8/2000 | Popovich ................. G02B 5/32 |
| | | | | 348/42 |
| 9,215,452 | B2 | * | 12/2015 | Watanabe ............ H04N 13/351 |
| 2006/0170834 | A1 | * | 8/2006 | Kim ....................... G02B 30/24 |
| | | | | 349/15 |
| 2012/0062565 | A1 | * | 3/2012 | Fuchs .................... H04N 13/31 |
| | | | | 345/419 |
| 2013/0050815 | A1 | | 2/2013 | Fukushima et al. |
| 2013/0077154 | A1 | * | 3/2013 | Popovich ............... G02B 30/27 |
| | | | | 359/316 |
| 2013/0162691 | A1 | | 6/2013 | Yang et al. |
| 2014/0009579 | A1 | | 1/2014 | Sumi et al. |
| 2014/0036047 | A1 | * | 2/2014 | Watanabe ............. H04N 13/31 |
| | | | | 348/54 |
| 2014/0340746 | A1 | | 11/2014 | Watanabe et al. |
| 2015/0054928 | A1 | * | 2/2015 | Wu ...................... H04N 13/305 |
| | | | | 348/59 |
| 2015/0201188 | A1 | * | 7/2015 | Pritch .................. H04N 13/327 |
| | | | | 348/189 |

* cited by examiner

METHOD FOR REDUCING MOIRE PATTERNS ON AN AUTOSTEREOSCOPIC DISPLAY

This application is the U.S. national phase of International Application No. PCT/NL2018/050887 filed 24 Dec. 2018, which designated the U.S. and claims priority to NL Patent Application No. 2020217 filed 30 Dec. 2017, the entire contents of each of which are hereby incorporated by reference.

The invention relates to a method for reducing moire patterns on an autostereoscopic display, which display comprises an array of pixels, each having at least one sub-pixel corresponding to a main color, lined with a view altering layer, such as a lenticular lens stack or parallax barrier, and wherein the display further comprises an eye tracking system for determining the position of the eyes of a viewer relative to the display.

With an autostereoscopic display it is possible to provide the experience of three-dimensional images to a viewer without the viewer having to wear special glasses. The view altering layer, which is typically a lenticular lens stack or parallax barrier, provided on the display allows for pixels on the display only to be seen by either the left eye or right eye of a viewer. This provides the possibility to use the display and create distinct images for the left eye and the right eye, such that the viewer will experience a three-dimensional image.

The created distinct images displayed on the autostereoscopic display are based on a single viewing position of the viewer. As soon as the viewer shifts relative to the display, the images fall out of sync and the perception of a three-dimensional image is lost. To this end it is known to use an eye tracking system, which determines the position of the eyes, such that the generated image for the display can be adjusted to the position of the viewer.

However, due to the view altering layer and due to the blackmatrix around the pixels, a viewer will experience a moire effect. In this application, the blackmatrix is understood to be the black space around a pixel. Also sub-pixels of a different color are allocated to this blackmatrix for a specific color. So, in case a pixel has a red, green and blue sub-pixel, when only red sub-pixels are considered, the green and blue sub-pixels also provide black space contributing to the moire effect. As a result, the blackmatrix differs for the respective primary colors, as the positions of the three sub-pixels of each pixel are different. So, from a fixed viewing position, one could observe a moire pattern for the red color, while no or a less prominent moire pattern is present for the blue and green colors. Furthermore, the observed moire pattern will change when the viewing position is changed.

The blackmatrix around a pixel (but not due to switched off sub-pixels) is typically reduced by providing a lens and enlarging the sub-pixels. However, due to manufacturing tolerances, some of the blackmatrix will still be visible and cause the moire effect.

Known CRT-displays, displaying only 2D images, could also exhibit moire patterns. For such CRT-displays it is known to shift the image relative to the display or to provide a filter layer reducing the sharpness of the image in order to reduce the moire effect. However, these solutions cannot be used in an autostereoscopic display as correct positioning of the image is essential for a correct 3D image display.

It would be possible with an autostereoscopic display to change the view altering layer, however due to manufacturing limitations, the possibilities to reduce the moire effect are also limited.

Accordingly, it is an object of the invention to reduce or even remove the above mentioned disadvantages.

This object is achieved according to the invention with a method for reducing moire patterns on an autostereoscopic display, which display comprises an array of pixels, each having at least one sub-pixel corresponding to a main color, lined with a view altering layer and wherein the display further comprises an eye tracking system for determining the position of the eyes of a viewer relative to the display, which method comprises the steps of:

moire pattern detection by repeating for each main color the steps of:
 activating the sub-pixels of all pixels corresponding to the single main color;
 obtaining moire pattern data by observing the display from a plurality of viewing positions;
 determining from the obtained moire pattern data the frequency, phase, direction and amplitude of the moire pattern for each of the viewing positions and storing the determined values;
controlling the pixels of the autostereoscopic display to display 3D images, wherein the controlling comprises at least the steps of:
 determining the viewing position of the eyes of a viewer using the eye tracking system;
 rendering 3D images from image data, while correcting the 3D images by superimposing a compensation pattern for each main color, which pattern is generated based on the stored values and the determined viewing position to reduce the moire pattern for said viewing position.

A moire pattern can be reduced by superimposing a compensation pattern. At a position, where the moire pattern would be the most prominent, i.e. a dark zone in the image, the brightness of the pixels at this zone can be increased to counteract the moire pattern and therewith reduce the observed moire pattern.

With the invention, an autostereoscopic display is first scanned to determine if a moire pattern is present from a specific viewing position. This moire pattern is to be determined for each of the main colors due to the different blackmatrix, especially when two or more sub-pixels are present per pixel. As a moire pattern is a repeating pattern, characterized by frequency, phase, direction and amplitude, it is sufficient to store these four values in order to predict at a later stage, what the moire pattern would be when no compensation would be applied and how the compensation pattern should be superimposed on the 3D images.

It should be noted that the superimposed pattern is different for the left eye and the right eye of the viewer. Furthermore, it should be noted, that the compensation pattern is also dependent on the image data: clearly if the image data shows a black screen, the moire effect is not visible and does not need to be compensated, whereas for a white screen a maximal compensation is desired.

In a preferred embodiment of the method according to the invention, in the step of determining from the obtained moire pattern data the frequency, phase, direction and amplitude of the moire pattern, a frequency domain transformation is used to determine multiple frequency, phase, direction and amplitude combinations defining the observed moire pattern in a viewing position.

Although the moire pattern has a main frequency with corresponding phase, direction and amplitude, often a moire pattern is an accumulation of different frequencies. By using a frequency domain transformation, the different frequencies and amplitude thereof can easily be extracted from the obtained moire pattern data.

In a further embodiment of the method according to the invention, the stored values comprise at least one absolute frequency, phase, direction and amplitude combination, and wherein the remaining stored values are relative to the at least one absolute frequency, phase, direction and amplitude combination.

By storing at least one absolute frequency, phase, direction and amplitude combination and provide the other values of different viewing positions as relative values, the memory for storing the values can be reduced.

In a further preferred embodiment of the method according to the invention, a physical model is defined to represent the remaining stored values.

As the dimensions and shapes of the view altering layer and pixel matrix are known, it is possible to define a physical model, such that from a single absolute frequency, phase, direction and amplitude combination from a single viewing position, it can be calculated what the frequency, phase, direction and amplitude combination will be for another viewing position.

Such a physical model can easily be implemented in the hardware of the display and only a small memory is required to store the single absolute frequency, phase, direction and amplitude combination, such that manufacturing costs for an autostereoscopic display implementing the method according to the invention can be kept low.

For example, the phase will typically change when the viewer moves along the display. The phase could therefore be dependent on the viewing position and the phase could in particular cases be expressed as a relative simple function of the viewing position.

Yet another embodiment of the method according to the invention further comprises the step of defining a mathematical model having at least a variable for the viewing position of the eyes of a viewer relative to the display, a variable for the main color and related parameters and the step of fitting the moire pattern data or the determined frequency, phase, direction and amplitude data on the mathematical model, wherein the parameters obtained by the fitting step are used in conjunction with the mathematical model to generate the compensation pattern.

Using fitting of the moire pattern data on a mathematical model allows for deviations in the autostereoscopic display due to manufacturing tolerances to be compensated for. As the moire pattern is observed from different viewing positions, the moire pattern data will incorporate the deviations in the display and by fitting this data on the mathematical model, the deviations in the display are taken into account while still a model is used.

These and other features of the invention will be elucidated in conjunction with the accompanying drawings.

Figure 1:
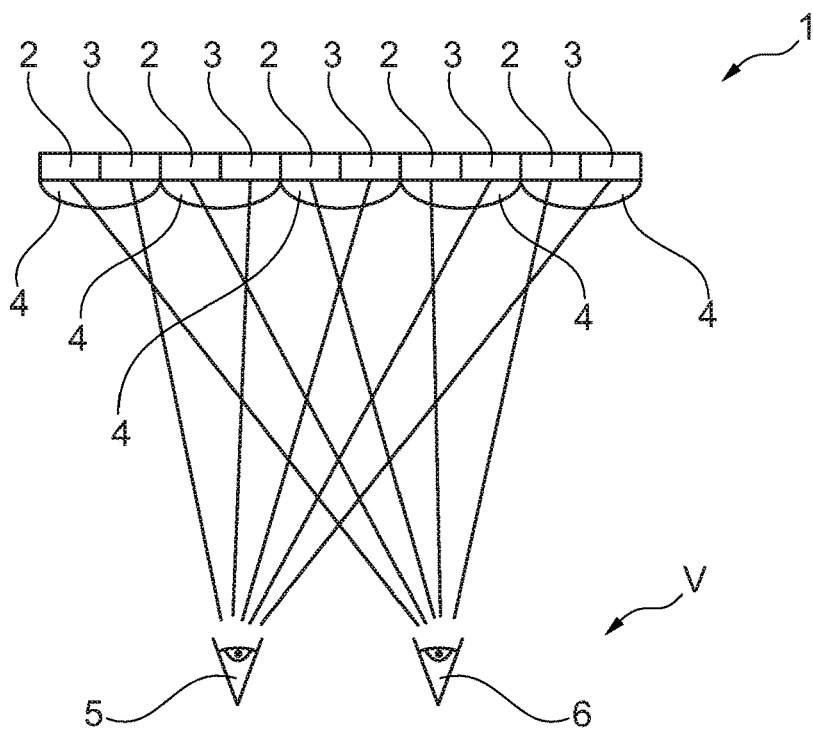
FIG. 1 shows schematically the basic functioning of an autostereoscopic display.

FIG. 1 shows schematically an autostereoscopic display 1 having an array of pixels 2, 3 lined with a lenticular lens stack 4.

When a viewer V looks at the screen with the left eye 5 and right eye 6, the lenticular lenses of the lens stack 4 will direct the light of the pixels 2 towards the right eye 6, while the light of the pixels 3 is direct into the left eye 5. So, when the viewer V is positioned correctly in front of the display 1, the left eye 5 will only see pixels 3, while the right eye 6 will only see pixels 2. This enables one to create with the pixels 2 an image different from the image created with the pixels 3. As a result the viewer V will experience a three-dimensional image.

Figure 2:
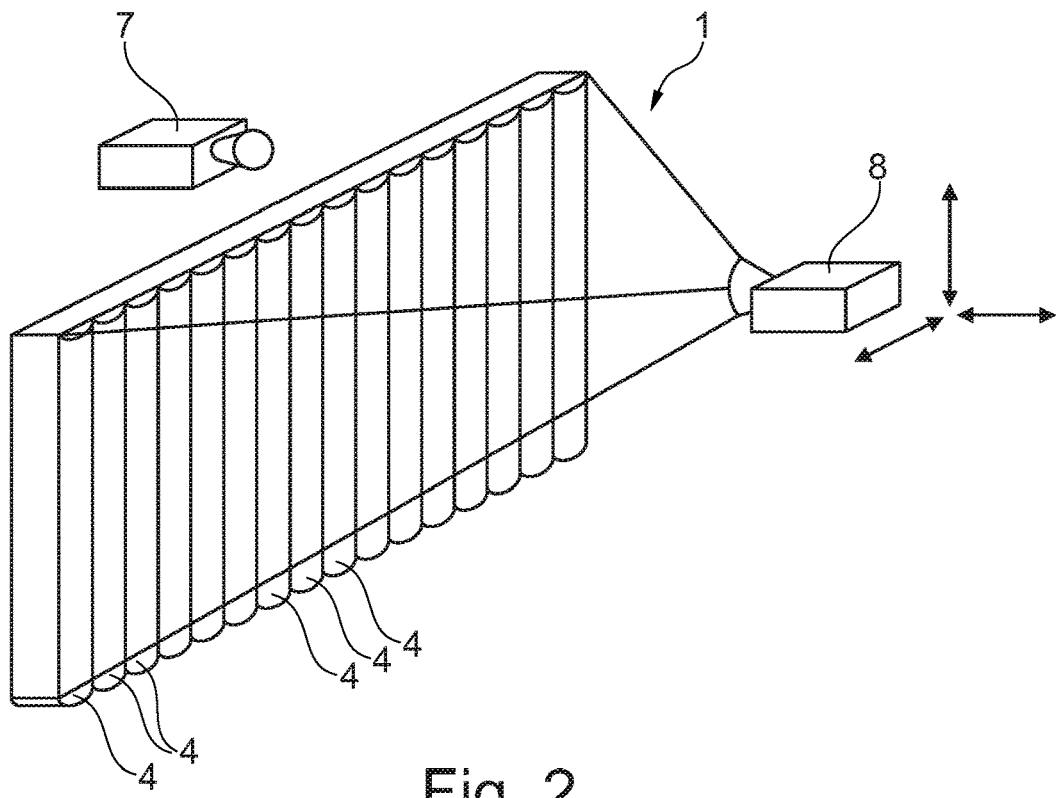
FIG. 2 shows schematically the autostereoscopic display of FIG. 1 with eye tracking and a camera for obtaining moire pattern data.

FIG. 2 shows the display 1 with an eye tracking system 7 mounted above the display 1, to establish the position of the eyes 5, 6 of the viewer V relative to the display 1.

In order to obtain moire pattern data, a camera 8 is positioned in front of the display 1 and observes the display 1, while one primary color of the sub-pixels is switched on. The moire pattern data is processed according to the method of the invention, which will be elucidated in conjunction with FIG. 5.

After observing the display 1a next main color/sub-pixel is turned on and the display 1 is observed and processed, such that moire pattern data is collected for all three main colors in the specific viewing position.

Then the camera 8 is moved to a next position, which can be in any three-dimensional direction, and the display 1 is scanned and observed again.

Figure 3:
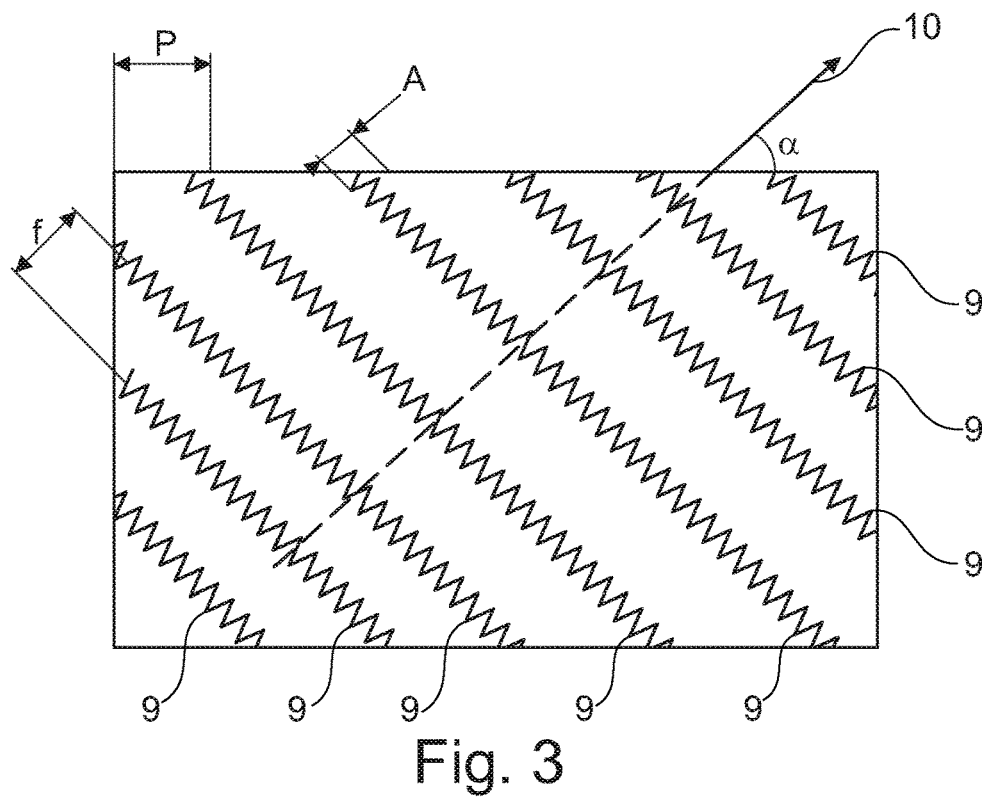
FIG. 3 shows schematically the obtained moire pattern data.

FIG. 3 shows schematically the obtained moire pattern data, which is basically an image of the display 1 on which the moire pattern is visible as parallel darker bands 9 running in a direction 10. The direction 10 has an angle α with the horizontal direction of the display 1.

From this moire pattern data, not only the direction 10, but also the frequency f, the amplitude A and the phase p can be determined. The phase p is in this example shown as the distance from the top left corner of the display 1 to the first band 9, but can also be defined in another way if desired.

Figure 4:
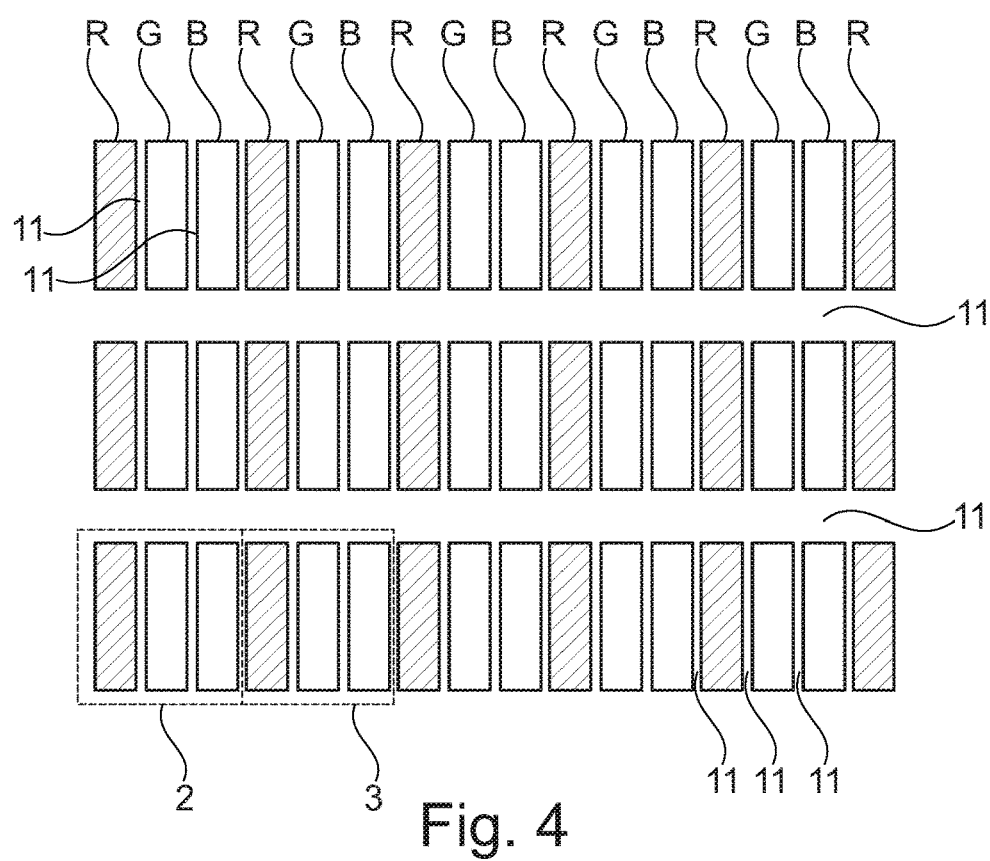
FIG. 4 shows a detailed view of the sub-pixels and blackmatrix.

FIG. 4 shows a detailed view of the sub-pixels R, G, B, of a number of pixels 2, 3 of which only two are encircled by a dashed line. The sub-pixels R are shown as switched on, while the sub-pixels G, B are shown switched off.

The blackmatrix which causes in combination with the lenticular lens stack 4 the moire patterns, is formed by the space 11 between the sub-pixels R, G, B, but also by the sub-pixels G, B which are switched off.

Figure 5:
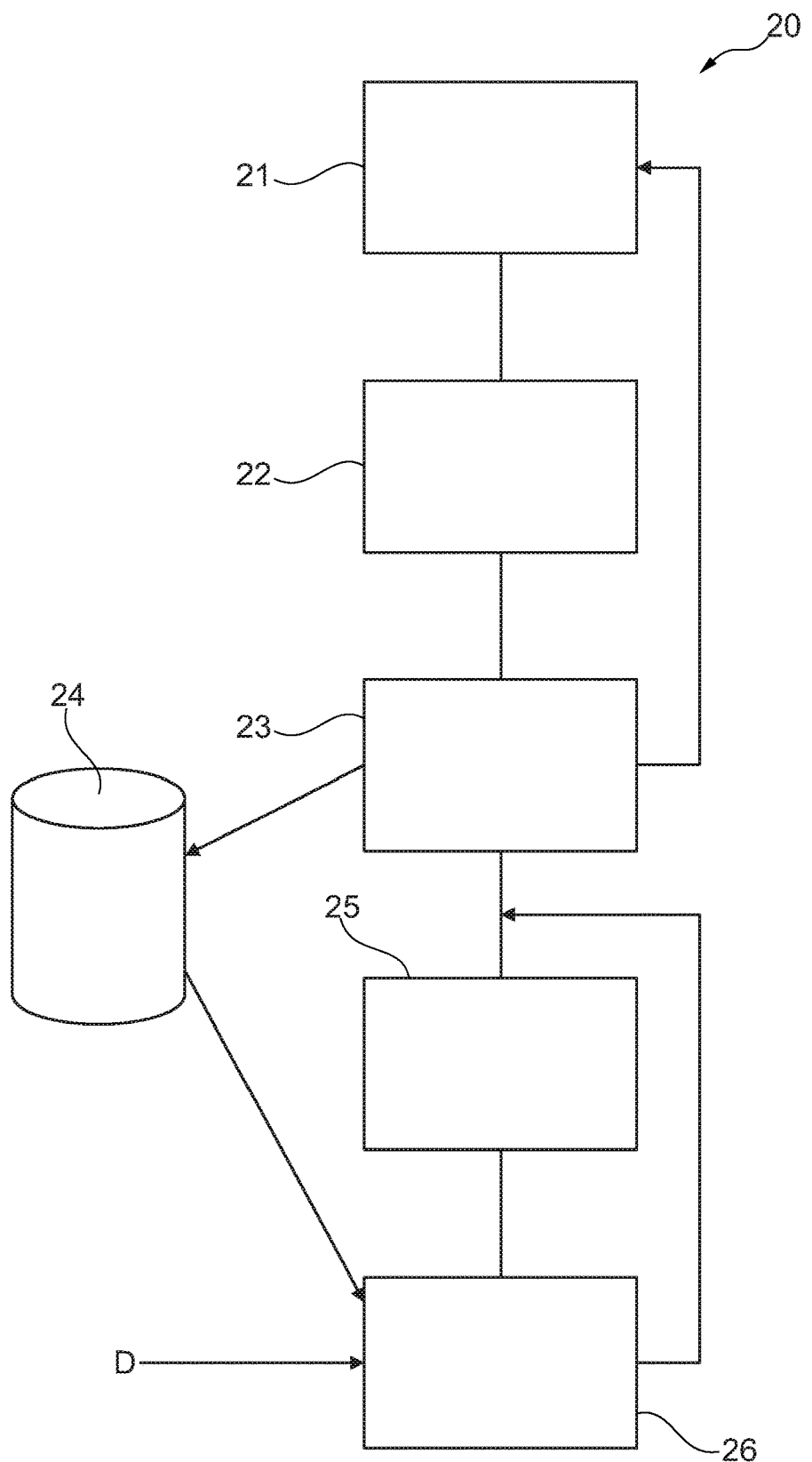
FIG. 5 shows a diagram of the method according to the invention.

FIG. 5 shows a diagram 20 of the method according to the invention. In the first step 21 of the diagram 20 a first of the three sub-pixels R, G, B is switched on, in this case the sub-pixels R, as shown in FIG. 4.

In step 22 the display 1 is observed by camera 8 as shown in FIG. 2 to obtain moire pattern data. From this moire pattern data is then, in step 23, determined what the frequency f, phase p, direction a and amplitude A of the moire pattern is and these values are stored in a memory 24.

The steps 21, 22, 23 are repeated for the sub-pixels G and B, such that for a plurality of viewing positions the observed moire patterns are known for each separate main color of the display 1 and such that the values characterizing the moire patterns are stored in the memory 24.

In the next step 25 the viewing position is determined with the eye tracking system 7 of the display 1. With this viewing position, the image data D and the values retrieved from the memory 24 are rendered, in step 26, into a 3D image with which the pixels 2, 3 of the display 1 are controlled.

When rendering the 3D image, the expected moire pattern corresponding to the determined viewing position is compensated for by superimposing a compensation pattern, in which the bands 9 of the moire pattern are reduced by increasing the brightness of the pixels 2, 3 at said bands 9.

During typical use of the display 1, the steps 25, 26 are repeated without interruption to reduce the moire patterns on the autostereoscopic display 1.

The invention claimed is:

1. Method for reducing moire patterns on an autostereoscopic display, which display comprises an array of pixels, each having at least one sub-pixel corresponding to a main color, lined with a view altering layer, and wherein the display further comprises an eye tracking system for determining the position of the eyes of a viewer relative to the display, which method comprises the steps of:
   moire pattern detection by repeating for ach main color the steps of:
      activating the sub-pixels of all pixels corresponding to the single main color;
      obtaining moire pattern data by observing the display from a plurality of viewing positions;
      determining from the obtained moire pattern data the frequency, phase, direction and amplitude of the moire pattern for each of the viewing positions and storing the determined values;
   controlling the pixels of the autostereoscopic display to display 3D images, wherein the controlling comprises at least the steps of:
      determining the viewing position of the eyes of a viewer using the eye tracking system;
      rendering 3D images from image data, while correcting the 3D images by superimposing a compensation pattern for each main color, which pattern is generated based on the stored values and the determined viewing position to reduce the moire pattern for said viewing position.

2. Method according to claim 1, wherein in the step f determining from the obtained moire pattern data the frequency, phase, direction and amplitude of the moire pattern, a frequency domain transformation is used to determine multiple frequency, phase, direction and amplitude combinations defining the observed moire pattern in the plurality of viewing positions.

3. Method according to claim 1, wherein the stored values comprise at least one combination of absolute values of frequency, phase, direction and amplitude, and wherein the remaining stored values are values relative to the values of the at least one absolute frequency, phase, direction and amplitude combination.

4. Method according to claim 3, wherein a physical model is defined to represent the remaining stored values.

5. Method according to claim 1, further comprising the step of defining a mathematical model having at least a variable for the viewing position of the eyes of a viewer relative to the display, a variable for the main color and related parameters and the step of fitting the moire pattern data or the determined frequency, phase, direction and amplitude data on the mathematical model, wherein the parameters obtained by the fitting step are used in conjunction with the mathematical model to generate the compensation pattern.

6. Method according to claim 1, wherein the view altering layer is a lenticular lens stack or a parallax barrier.

* * * * *